US012142909B2

(12) United States Patent
Pramod et al.

(10) Patent No.: US 12,142,909 B2
(45) Date of Patent: Nov. 12, 2024

(54) MITIGATION OF MICROCONTROLLER RESTART FROM POST-FAILURE SHUTDOWN CONDITION

(71) Applicant: STEERING SOLUTIONS IP HOLDING CORPORATION, Saginaw, MI (US)

(72) Inventors: Prerit Pramod, Bay City, MI (US); Nithin Kolli, Raleigh, NC (US); Aparna Saha, Saginaw, MI (US); Infane O. Lowe, Flint, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 38 days.

(21) Appl. No.: 17/489,347

(22) Filed: Sep. 29, 2021

(65) Prior Publication Data

US 2022/0021199 A1    Jan. 20, 2022

Related U.S. Application Data

(62) Division of application No. 16/539,202, filed on Aug. 13, 2019.

(Continued)

(51) Int. Cl.
*H02H 7/08* (2006.01)
*H02P 27/06* (2006.01)

(52) U.S. Cl.
CPC ........... *H02H 7/0833* (2013.01); *H02P 27/06* (2013.01)

(58) Field of Classification Search
CPC .. H02H 7/0833; H02H 7/0844; H02H 11/002; H02P 27/06; B62D 5/0463

(Continued)

(56) References Cited

U.S. PATENT DOCUMENTS 5,477,124 A    12/1995  Tamai
5,945,802 A *  8/1999  Konrad ............... H02P 23/0077
                                               318/807

(Continued)

FOREIGN PATENT DOCUMENTS

CN            1605141 A      4/2005
CN          101656418 A      2/2010

(Continued)

OTHER PUBLICATIONS

Chinese Search Report dated May 25, 2021, which issued in the corresponding Chinese Patent Application No. 2019107508953.

(Continued)

*Primary Examiner* — Thienvu V Tran
*Assistant Examiner* — Sreeya Sreevatsa
(74) *Attorney, Agent, or Firm* — Dickinson Wright PLLC

(57) ABSTRACT

Improvements to a power input circuit of an electric motor drive system are provided. The power input circuit is provided between a power source (e.g., battery), and a load (e.g., an inverter and a motor in the electric motor drive system). The power input circuit can comprise controllable switches for reverse polarity protection and isolation of the inverter under supply short circuit condition. In addition, an improvement to a power input circuit can comprise connection of a power supply (e.g., voltage regulator) to the external power source input side of a reverse polarity protection circuit in the power input circuit to mitigate against microcontroller restart from post-failure shutdown condition. Connection of a low-power diode in series with the voltage regulator also provides for reverse polarity protection.

6 Claims, 12 Drawing Sheets

Related U.S. Application Data

(60) Provisional application No. 62/718,893, filed on Aug. 14, 2018.

(58) Field of Classification Search
USPC .......................................................... 318/434
See application file for complete search history.

(56) References Cited

U.S. PATENT DOCUMENTS

| | | |
|---|---|---|
| 6,611,410 B1 | 8/2003 | Makaran |
| 6,963,183 B1 | 11/2005 | Kessler |
| 6,969,971 B2 | 11/2005 | Dubhashi |
| 7,139,157 B2 | 11/2006 | Taylor |
| 2004/0150927 A1* | 8/2004 | Strayer .................... H02H 9/04 361/82 |
| 2004/0264084 A1 | 12/2004 | Jokinen |
| 2005/0166882 A1* | 8/2005 | Suzuki .................... F02P 3/005 123/143 C |
| 2006/0113954 A1* | 6/2006 | Ma ........................ H02P 29/0241 318/803 |
| 2008/0012543 A1* | 1/2008 | Negoro .................... G05F 1/46 323/272 |
| 2010/0046132 A1* | 2/2010 | Tai ...................... H05K 7/20209 361/84 |
| 2011/0115462 A1 | 5/2011 | Babcock et al. |

FOREIGN PATENT DOCUMENTS

| | | |
|---|---|---|
| CN | 102792541 A | 11/2012 |
| CN | 106532677 A | 3/2017 |
| CN | 206932160 U * | 1/2018 |
| CN | 109390904 A | 2/2019 |
| WO | 2010108899 A1 | 9/2010 |
| WO | 2016041884 A1 | 3/2016 |

OTHER PUBLICATIONS

Chinese Office Action dated Jun. 1, 2021, which issued in the corresponding Chinese Patent Application No. 2019107508953.
Chinese Office Action dated Mar. 24, 2022, which issued in the corresponding Chinese Patent Application No. 2019107508953.
Chinese Search Report dated Mar. 18, 2022, which issued in the corresponding Chinese Patent Application No. 2019107508953.

\* cited by examiner

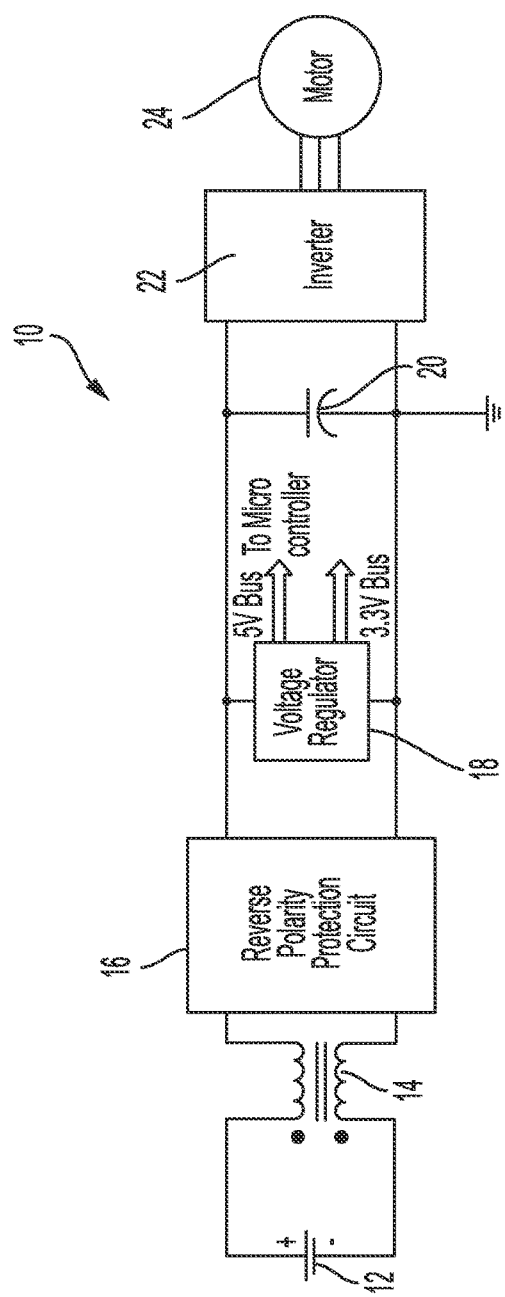
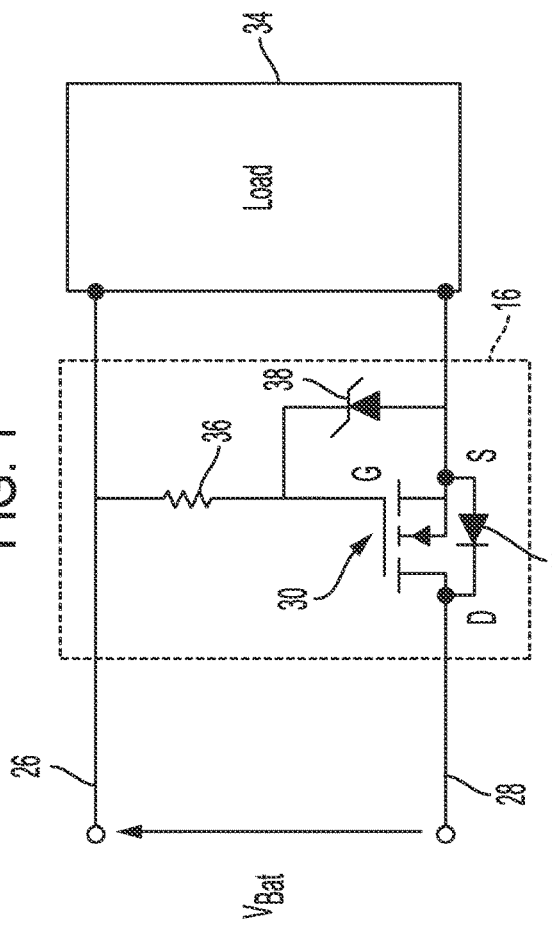

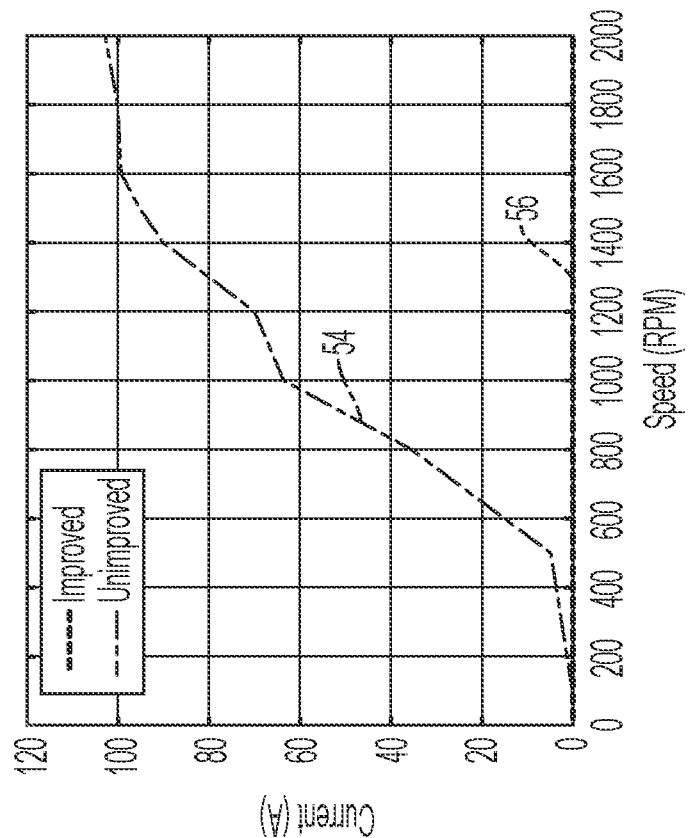
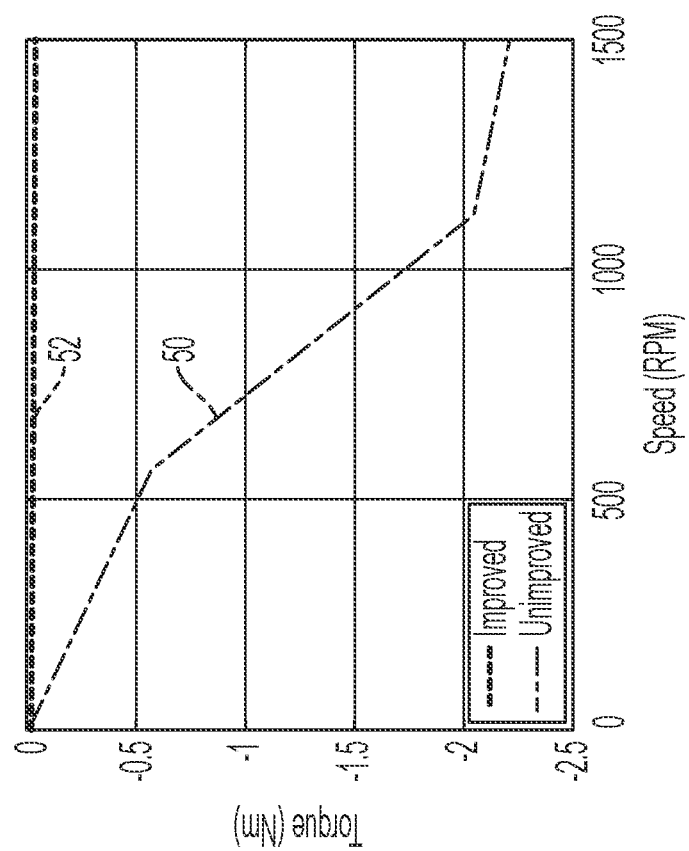
FIG. 12B
FIG. 12A

MITIGATION OF MICROCONTROLLER RESTART FROM POST-FAILURE SHUTDOWN CONDITION

This patent application is a divisional application of U.S. patent application Ser. No. 16/539,202, filed on Aug. 13, 2019, which claims priority to U.S. Provisional Patent Application Ser. No. 62/718,893, filed Aug. 14, 2018, the entire contents of which are incorporated herein by reference.

BACKGROUND

The present application generally relates to the field of electric motor controls.

Short-circuit of the supply input to a motor drive system leads to generation of braking torque by the motor at high speeds. In the context of an electric power steering (EPS) system, this leads to the driver needing to apply efforts above manual steering. This is an undesirable situation.

Another problem with existing motor drive systems is unwanted microcontroller restart after a post-fault shutdown sequence (e.g., during a supply short condition, or battery disconnection). Microcontroller restart can occur when the motor starts spinning at high velocities and charges the bulk capacitor in a motor drive system. The bulk capacitor, in-turn, acts as a voltage input to the power supply such as the voltage regulator, which ultimately powers a microcontroller up for operation even when its operation is no longer desired under fault conditions.

Unintended microcontroller restart is an undesirable situation, particularly in redundant systems. For example, unintended microcontroller restart after a post-fault shutdown sequence can cause faulty inter-microcontroller communications. Also, in the context of dual redundant systems in automotive electric motor controls, unintended microcontroller restart can result in the availability of lower than half of the total assist torque when one side of the system is under this fault condition.

SUMMARY

Described herein are example embodiments of a power input circuit for a motor drive system. In a motor drive system that has a DC power source, and inverter and a motor, an example power input circuit is connected between the DC power source and the inverter.

Described herein are one or more embodiments of a power input circuit that provides reverse polarity protection and isolation of the inverter from the battery fault and therefore overcomes the problem explained above by disconnecting or isolating a short-circuit line from the motor drive system.

Further, described herein, are one or more embodiments of a power input circuit that comprises at least two switches to control biasing of reverse polarity protection circuitry.

Described herein, are one or more embodiments of a power input circuit for a motor drive system, the power input circuit comprising: a first switch disposed between the power source and a load comprising the motor, the first switch configured to provide reverse polarity protection from the power source; and a second switch connected to the first switch and configured to prevent activation of the first switch to close and conduct power from the power source to the load during a reverse polarity condition of the power source, and to isolate the load during a short circuit condition of the power source. For example, the first switch and the second switch can be selected from the group consisting of a metal oxide semiconductor field effect transistor (MOSFET), a bipolar junction transistor (BJT), an insulated-gate bipolar transistor (IGBT), or a thyristor.

Described herein, are one or more embodiments of a power input circuit, wherein the first switch is disposed in a direct current (DC) bus return path of the power source and is configured to be closed when a positive terminal of the power source is connected to a DC bus supply path of the power source, and be open when a negative terminal of the power source is connected to the DC bus supply path, to provide reverse polarity protection; the second switch is connected between the first switch and the load and configured to be closed when the first switch is closed, and to be open when the first switch is open and when a positive voltage is received from the load; the first switch is selected from the group consisting of a n-channel MOSFET (nMOS), a NPN type BJT, a n-channel type IGBT, or a n-channel type thyristor, and the second switch is selected from the group consisting of p-channel MOSFET (pMOS), a PNP type BJT, a p-channel type IBGT, or a p-channel type thyristor.

Described herein, are one or more embodiments of a power input circuit, wherein the first switch is disposed in a DC bus supply path, and the first switch can be a nMOS type MOSFET having a drain terminal connected to a DC bus return path, a source terminal connected to ground and a gate terminal connected to a gate resistor and controlled by the second switch, and the second switch is a pMOS type MOSFET having a drain terminal connected to the gate terminal of the first switch, a source terminal connected to the DC bus supply path and a gate terminal connected to the DC bus return path.

Described herein, are one or more embodiments of a power input circuit, wherein the first switch is disposed in a DC bus return path, the first switch can be a n-channel MOSFET (nMOS), and the power input circuit further comprises a resistor connected between the gate terminal and the source terminal of the first switch.

Described herein, are one or more embodiments of a power input circuit, wherein the first switch is disposed in a DC bus return path, the first switch can be a n-channel MOSFET (nMOS), and the power input circuit further comprises a first resistor connected between the gate terminal and the source terminal of the second switch, and a second resistor connected between the gate terminal of the second switch and the DC bus return path, wherein the second resistor has larger resistance than resistance of the first resistor Described herein, are one or more embodiments of a power input circuit, wherein the first switch is disposed in a direct current (DC) bus supply path of the power source and is configured to be closed when a positive terminal of the power source is connected to the DC bus supply path, and be open when a negative terminal of the power source is connected to the DC bus supply path, to provide reverse polarity protection; and the second switch is connected between the first switch and ground and configured to be closed when the first switch is closed, and to be open to isolate the first switch from ground when a power source fault occurs; wherein the first switch is selected from the group consisting of a pMOS type MOSFET, a PNP type BJT, a p-channel type IGBT, or a p-channel type thyristor, and the second switch is selected from the group consisting of nMOS type MOSFET, a NPN type BJT, a n-channel type IGBT, or a n-channel type thyristor.

Described herein, are one or more embodiments of a power input circuit, wherein the first switch is disposed in a DC bus supply path, and the first switch can be a p-channel MOSFET (pMOS) having a drain terminal connected to a DC bus supply path, a source terminal connected to a bulk capacitor, and a gate terminal controlled by the second switch and connected to a gate resistor, and the second switch is a n-channel MOSFET (nMOS) having a drain terminal connected to the gate resistor of the first switch, a source terminal connected to ground and a gate terminal connected to the DC bus supply path.

Described herein, are one or more embodiments of a power input circuit, wherein the first switch is disposed in a DC bus supply path, and the first switch can be a p-channel MOSFET (pMOS), and the power input circuit further comprises a resistor connected between the gate terminal and the source terminal of the first switch.

Described herein, are one or more embodiments of a power input circuit, wherein the first switch is disposed in a DC bus supply path, and the first switch can be a p-channel MOSFET (pMOS), and the power input circuit further comprises a first resistor connected between the gate terminal and the source terminal of the second switch, and a second resistor connected between the gate terminal of the second switch and the DC bus supply path, wherein the first resistor has larger resistance than resistance of the second resistor.

Further yet, described herein, are one or more embodiments of a power input circuit for a motor drive system that connects a power supply (e.g., voltage regulator) to the external DC source input side of a reverse polarity protection circuit and therefore avoids the problem explained above whereby a microcontroller undesirably restarts from a post-failure shutdown.

Described herein, are one or more embodiments of a power input circuit comprising a reverse polarity protection circuit comprising a first switch disposed between the power source and a load comprising the motor, the first switch configured to provide reverse polarity protection from the power source; and a voltage regulator circuit connected in parallel with the reverse polarity protection circuit and across the terminals of the power source; wherein the voltage regulator circuit is connected to the power source input side of the reverse polarity protection circuit to isolate the voltage regulator circuit from a load side voltage.

Described herein, are one or more embodiments of a power input circuit further comprising a diode connected in series with the voltage regulator, the voltage regulator circuit and the diode connected across the terminals of the power source and the diode configured to provide the voltage regulator circuit with reverse polarity protection from the power source.

Described herein, are one or more embodiments of a power input circuit, wherein the reverse polarity protection circuit comprises a second switch connected to the first switch and configured to prevent activation of the first switch to close and conduct power from the power source to the load during a reverse polarity condition of the power source, and to isolate the load during a short circuit condition of the power source.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the illustrative embodiments are apparent from the following detailed description taken in conjunction with the accompanying drawings in which:

FIG. 1 is a block diagram of a motor drive system;

FIG. 2 is a circuit diagram of a reverse polarity protection circuit;

FIGS. 12A and 12B are diagrams illustrating improvement of motor drive systems that employ a power input circuit with an improved reverse polarity protection circuit according to one or more embodiments.

DETAILED DESCRIPTION

Figure 3:
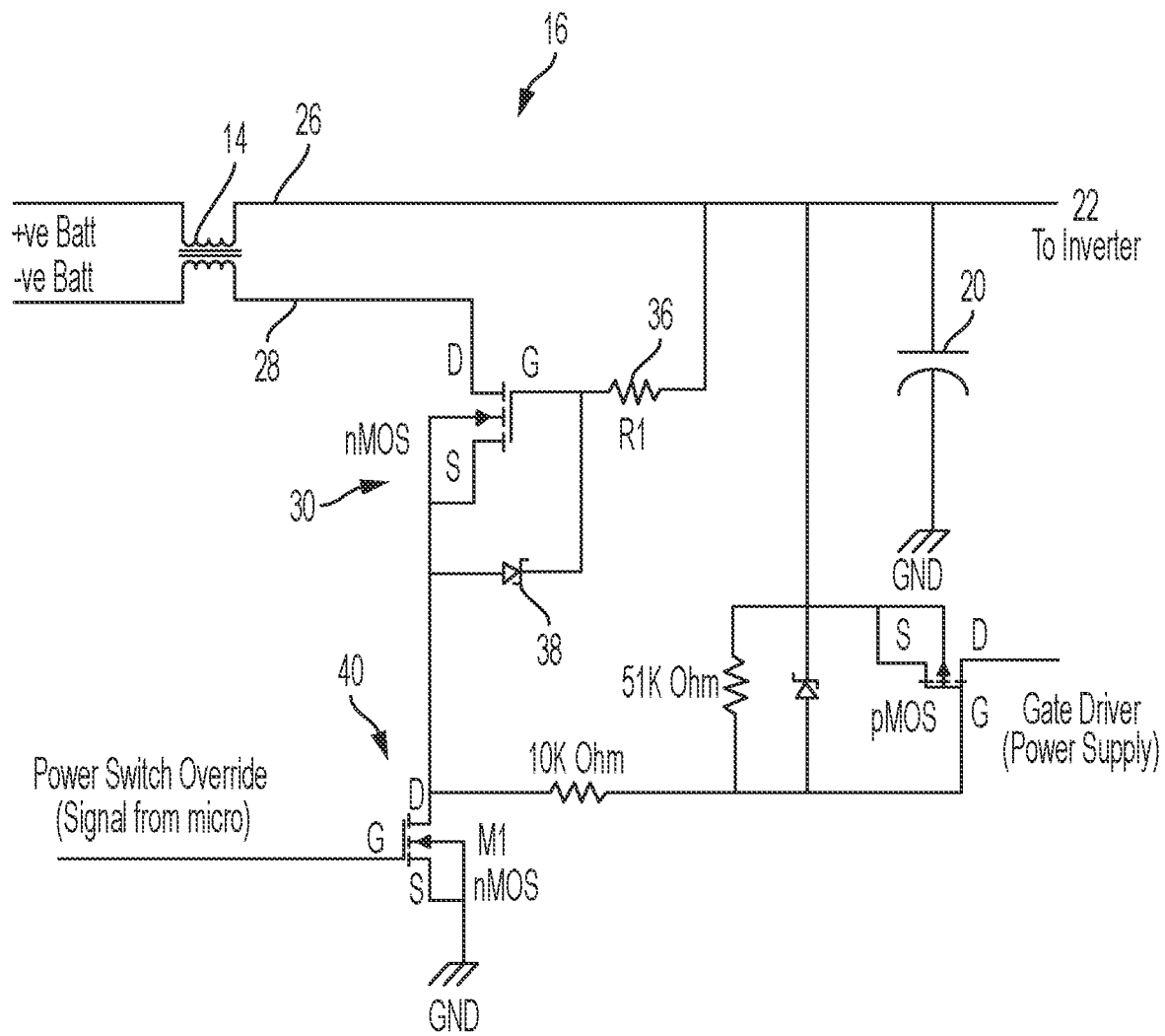
FIG. 3 illustrates a power input circuit with an improved reverse polarity protection circuit wherein the source of a reverse polarity FET is connected to the drain of another switch, according to one or more embodiments.

Specific, non-limiting embodiments will now be described with reference to the Figures in which FIG. 1 depicts an example motor drive system 10. The motor drive system 10 comprises a power source 12, a common mode choke 14, a reverse polarity protection circuit 16, a power supply 18 (e.g., a voltage regulator for supplying selected voltage(s) such as 5V or 3.3V to components such as one or more microcontroller(s) on one or more printed circuit board(s) (PCB(s)) not shown), a bulk capacitor 20, an inverter 22, and a motor 24. The power source 12 is illustrated as a battery such as a 12V battery used in automotive motor drive systems. It is to be understood, however, that the illustrative embodiments are advantageous when used with various motor types (e.g., AC and DC motors) and various power converter configurations.

The illustrative embodiments described below provide low cost solutions to the above-described problems and have the additional advantage of negligible power consumption. Further, several of the illustrative embodiments are microcontroller-independent. Still further, some of the illustrative embodiments provide an additional benefit of rapid discharge of the bulk capacitor 20. While generally described herein in the context of EPS systems, the illustrative embodiments are each applicable to all electric motor drive systems and do not necessarily depend on the mechanical system within which it is employed.

By changing the battery of a car or during maintenance work on the electronic system of an automobile or other mechanical system, the battery has to be reconnected. During this event, it is possible that the polarity of the battery could be applied in reverse direction. With reverse applied voltage, a short circuit via diodes or transistors could occur, leading to errors or damage of the electronics of an automobile or other system within which it is employed. This means that the Electronic Control Unit(s) or ECU(s) should be protected against reverse battery polarity.

FIG. 2 illustrates an example reverse polarity protection (RPP) circuit 16 and omits the power source 12 on the source input side of the RPP circuit 16, and the voltage regulator 18, bulk capacitor 20, inverter 22, and motor 24 on the load side of the RPP circuit 16, for clarity. With reference to FIG. 2, inserting a switch 30 in the right direction in the DC bus supply path 26 can protect the load indicated generally at 34 against battery reversal. To lower the power losses of the reverse battery protection, a metal oxide semiconductor field effect transistor (MOSFET) can be used for the switch 30. It has to be noted that a MOSFET has an intrinsic anti-parallel body diode indicated at 32. A nMOS on the low side is one of the options described herein for the switch 30 in the RPP circuit 16 in the illustrative embodiments. The gate is biased with a resistor 36 connected to the positive bus (i.e., DC bus supply path 26) and a Zener diode 38 is connected across gate and source as over voltage protection.

In the illustrative embodiments described herein and with continued reference to FIG. 2, the operation of this switch 30 is involuntary. In other words, the gate of the switch 30 is biased based on the connection of battery terminals, i.e., if the battery is connected in right polarity (e.g., the positive battery terminal is connected to the DC bus supply path 26 and the negative battery terminal is connected to the DC bus return path), the voltage between the MOSFET gate and source terminals (VGS) will be positive and, if the battery is connected in the opposite direction, VGS will be negative. Accordingly, whenever there is a positive voltage appearing on the DC bus supply path 26, the switch 30 turns on.

A problem occurs with the topology illustrated in FIG. 2 when this switch 30 gets turned on when it should not be turned on. This can happen when a generated voltage appears on the bus 26 from the load side 34, which usually happens when the motor 34 is rotating and acting as a generator and the bulk capacitor, in-turn, acts as a voltage input. Since this switch 30 is now turned on, any fault from the battery side now appears across the inverter bus. This is not desired because the currents flowing in the windings cause braking torque.

Illustrative embodiments provided different ways to control activation or biasing of the switch 30 in the RPP circuit 16 to prevent undesired biasing or activation of the switch 30. For example, the braking torque caused by power input short-circuit is mitigated by an improved power input circuit. As a further example described in connection with illustrative embodiments below, the bias circuitry of a reverse polarity field effect transistor (FET) used as the switch 30 for battery protection is redesigned in order to leverage the switch 30 to disconnect a short-circuit line from the rest of the motor drive system 10.

FIG. 3 illustrates a power input circuit with an improved RPP circuit 16 in which the source of the FET 30 is connected to a switch 40 that connects to a ground. During the fault scenario, since there is no battery, the microcontroller (not shown) in the system 10 will not be giving any signals for any of the switches 30, 40. So, the switch 40 (e.g., switch M1 in FIG. 3) that biases the power disconnect switch is now open. So, even if a voltage appears on the positive terminal of the choke 14 output (i.e., the bulk capacitor voltage), the source of the reverse polarity switch 30 is isolated from the ground. As a result, the switch 30 will be open and battery fault is does not appear across the inverter 22.

Figure 4:
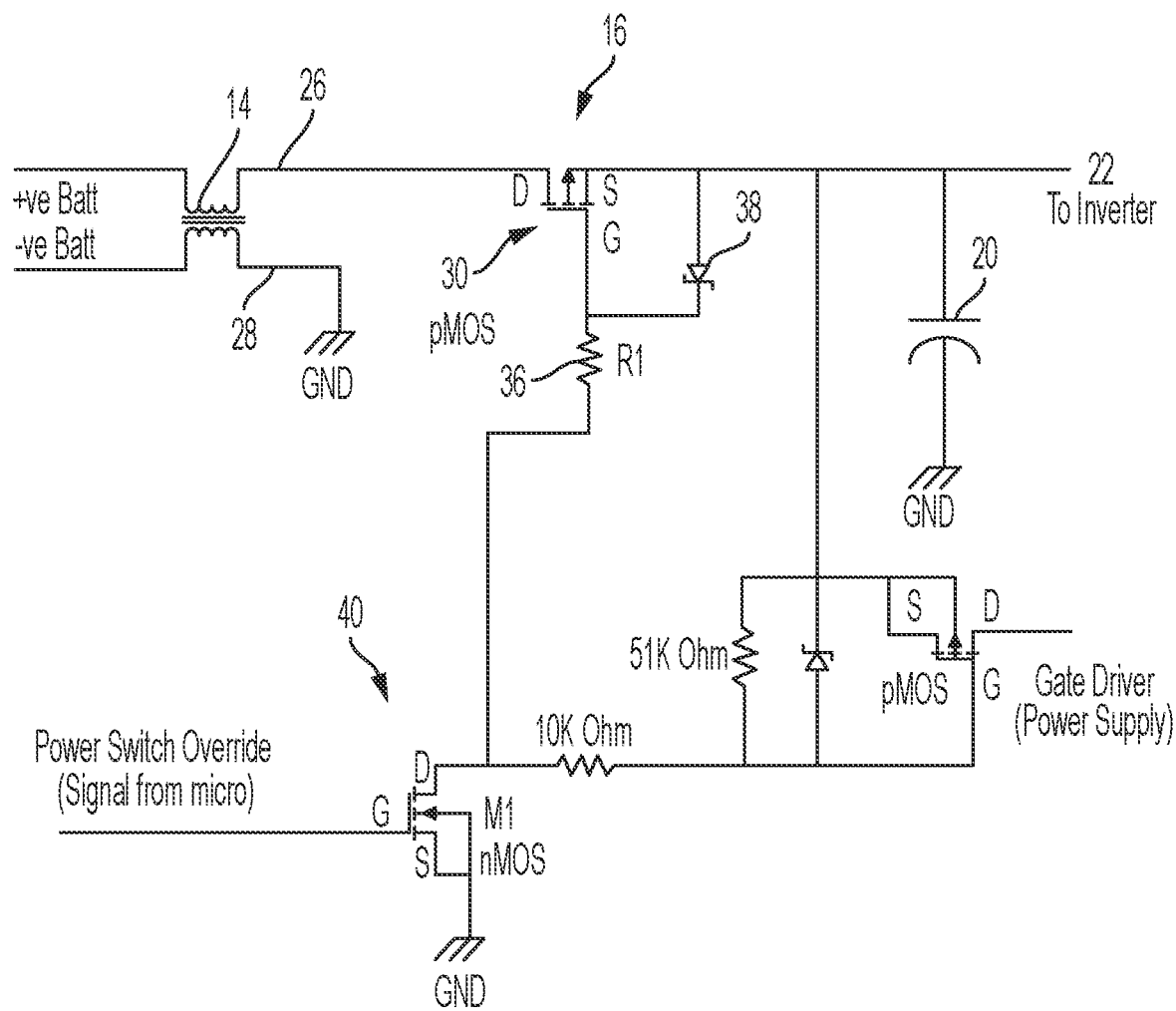
FIG. 4 illustrates a power input circuit with an improved reverse polarity protection circuit comprising a reverse polarity pMOS on the high side of the DC bus, according to one or more embodiments.

FIG. 4 illustrates using a pMOS on the high side 26 as the switch 30 and connecting the gate resistor 36 to a controlled switch 40. During the fault scenario, since there is no battery, the microcontroller (not shown) will not be giving any signals for any of the switches 30, 40. So, the switch 40 (e.g., switch M1 in FIG. 4) that biases the power disconnect switch is now open. Even if a voltage appears on the bulk capacitor voltage, the gate of the reverse polarity switch 30 is isolated from the ground and hence the switch 30 is not biased. As a result, the switch 30 will be open and battery fault is does not appear across the inverter 22.

Figure 5:
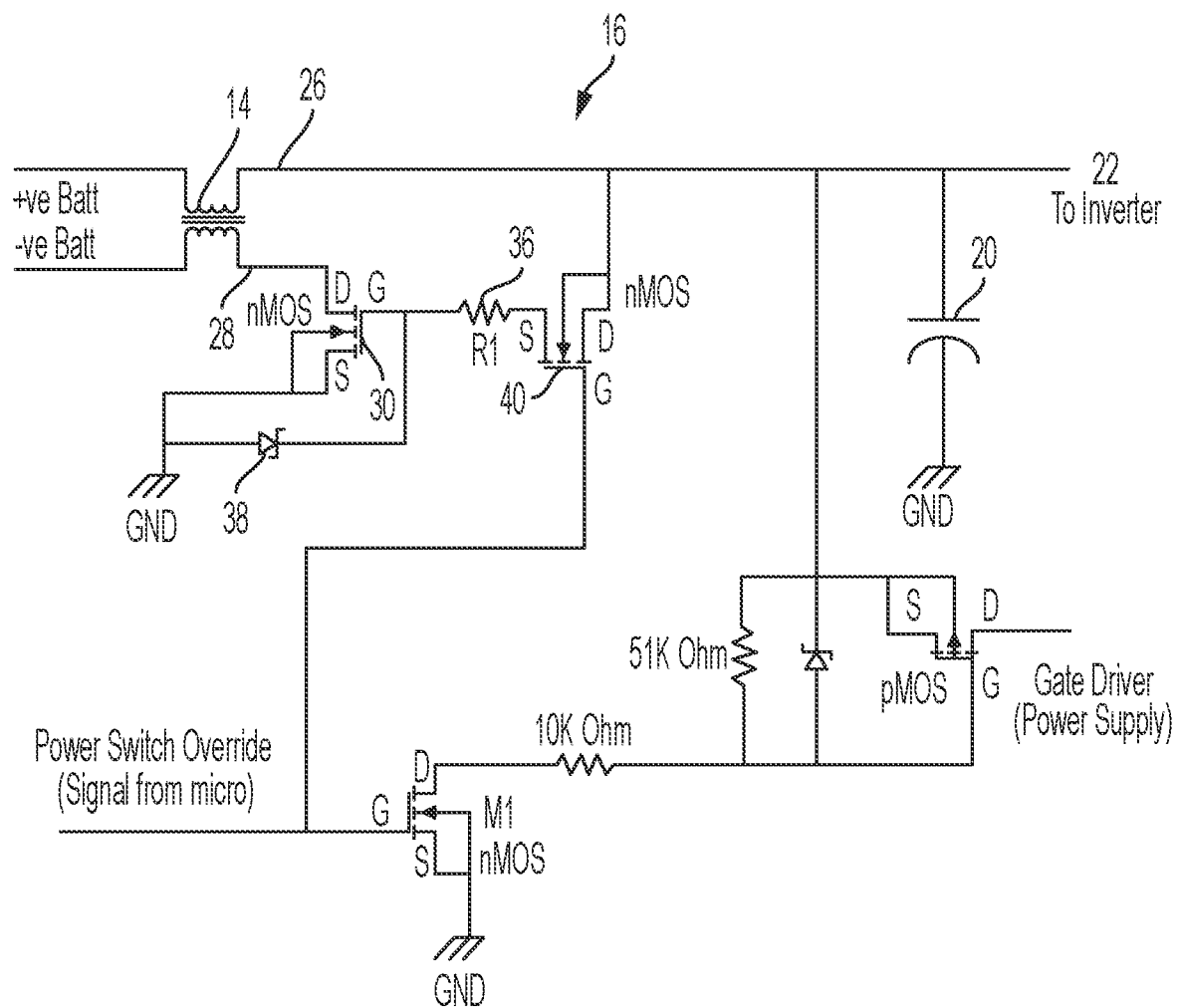
FIG. 5 illustrates a power input circuit with an improved reverse polarity protection circuit comprising a nMOS across the gate resistor of a reverse polarity nMOS, according to one or more embodiments.

FIG. 5 illustrates adding a switch 40 that is an additional nMOS connected between gate resistor 36 and the positive bus 26 and controlling the switch 40's gate. During the fault scenario, since there is no battery, the microcontroller will not be giving any signals for any of the switches. There would not be any signal coming from the microcontroller to turn on the switch 40. The gate resistor 36 of the reverse polarity protection switch 30 will be now floating. Even if a voltage appears on the positive terminal of the choke 14 output (bulk capacitor voltage), the gate of the reverse polarity switch 30 is not biased. As a result, the switch 30 will be open and battery fault does not appear across the inverter 22.

Figure 6:
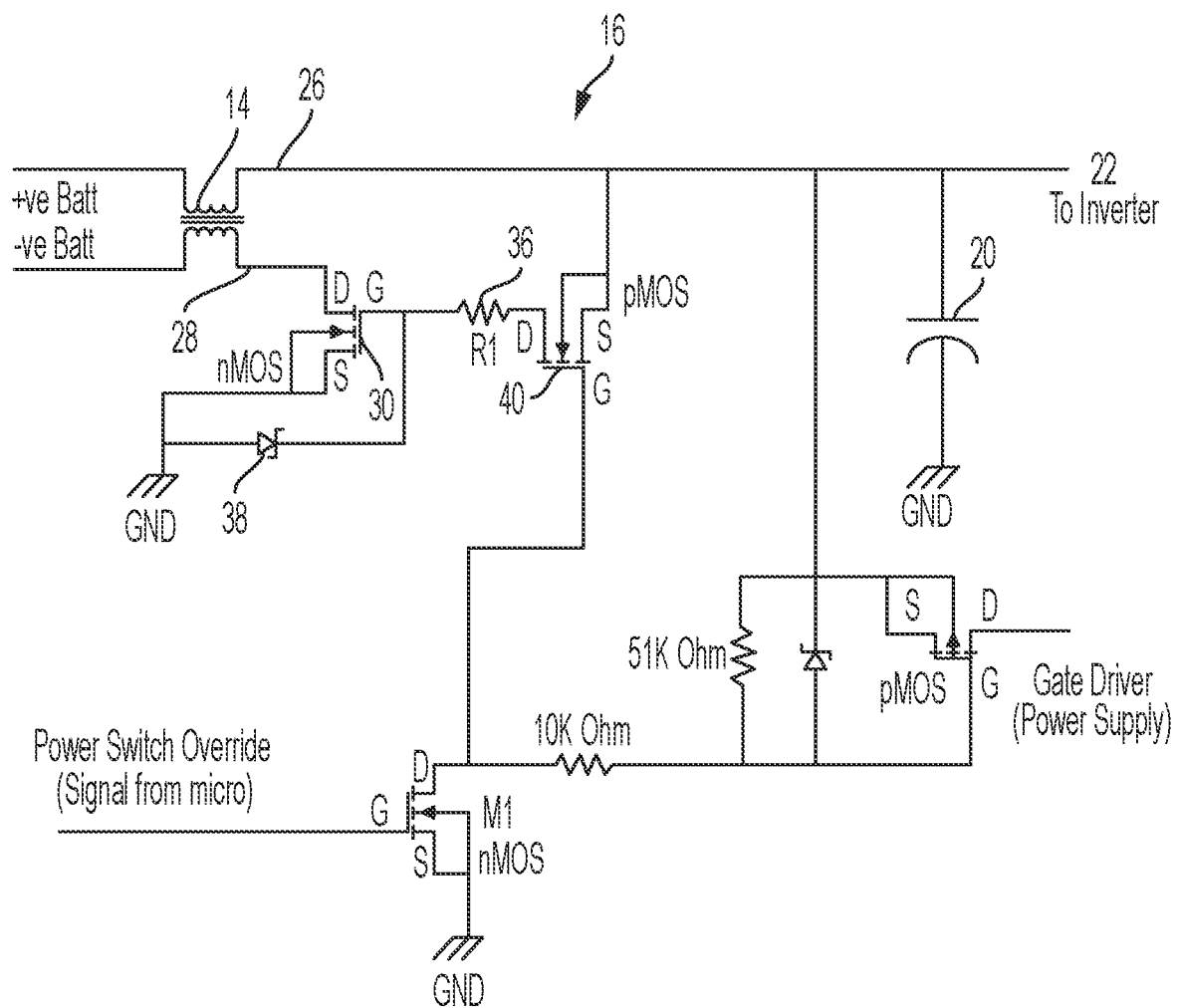
FIG. 6 illustrates a power input circuit with an improved reverse polarity protection circuit comprising a pMOS across the gate resistor of a reverse polarity nMOS and controller dependent, according to one or more embodiments.
Figure 7:
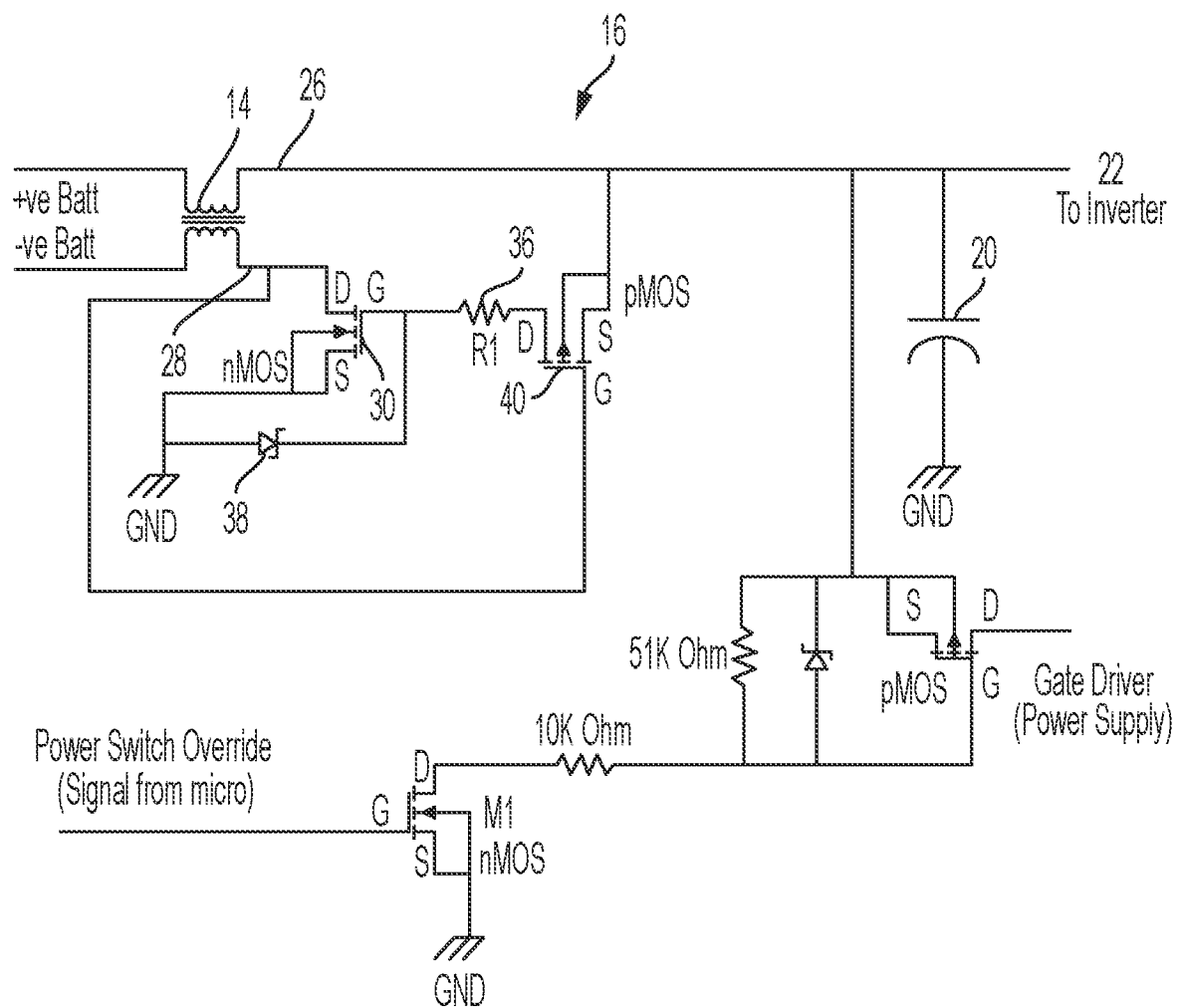
FIG. 7 illustrates a power input circuit with an improved reverse polarity protection circuit comprising a pMOS across the gate resistor of a reverse polarity nMOS and controller independent, according to one or more embodiments.
Figure 8:
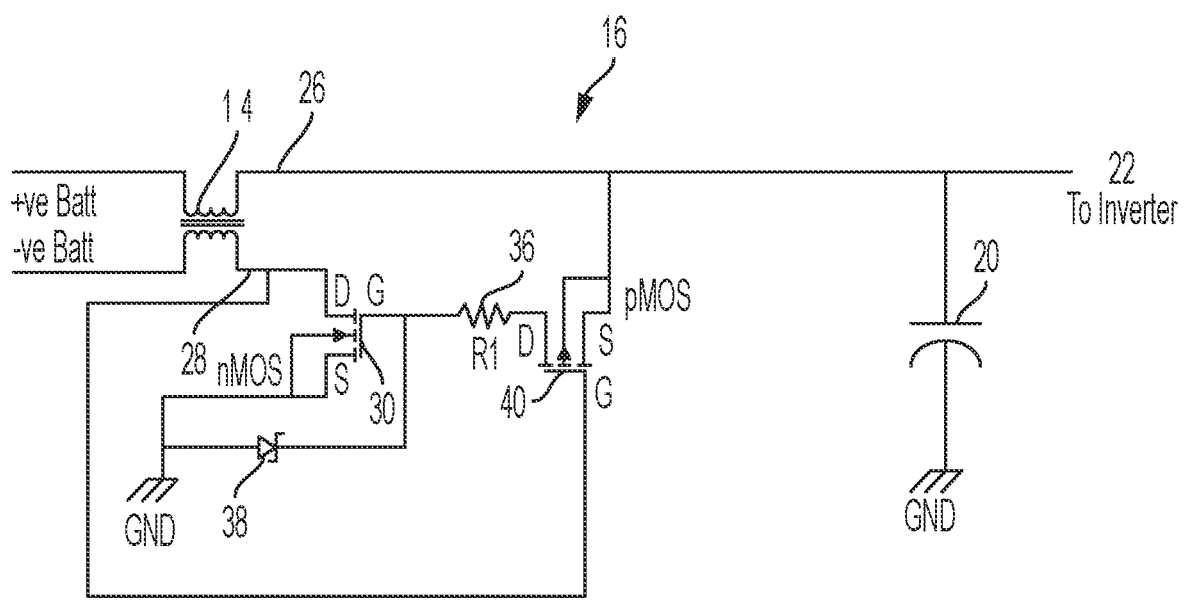
FIG. 8 illustrates a simplified circuit diagram of FIG. 7.

FIG. 6 illustrates adding a switch 40 that is an additional pMOS between gate resistor 36 and positive bus 26 and controlling switch 40's gate. During the fault scenario, since there is no battery, the microcontroller will not be giving any signals for any of the switches. There would not be any signal coming from the microcontroller to turn on the switch 40. The gate resistor of reverse polarity protection switch 30 will be now floating. Even if a voltage appears on the positive terminal of the choke 14 output (bulk capacitor voltage), the gate of the reverse polarity switch 30 is not biased. As shown, the switch 30 will be open and battery fault does not appear across the inverter.

The above-described embodiments in FIGS. 3-6 are dependent on operation of a microcontroller. The illustrative embodiments in FIGS. 7-11 are advantageous in that the operation of the RPP circuit 16 is independent of control signals (e.g., from a microcontroller) and cost effective. The switch 40 in the illustrative embodiments in FIGS. 7-10 is an additional pMOS connected between the gate resistor 36 for reverse polarity protection FET 30 and the positive bus 26. The gate of the added pMOS 40 is connected to the drain of reverse polarity protection FET 30. This addition of a small pMOS for the switch 40 serves the purpose of reverse polarity protection and also isolates the inverter 22 from battery faults by turning off the reverse polarity protection FET 30. In accordance with another illustrative embodiment depicted in FIG. 11, the reverse polarity switch 30 is a pMOS, and the additional switch 40 is a nMOS that provides reverse polarity protection and isolates the inverter 22 by turning off the reverse polarity switch 30 (e.g., isolating the gate of an reverse polarity FET 30). In other words, the bulk capacitor 20 is isolated from the short-circuited battery line thus not allowing any current to flow.

With reference to FIGS. 7-10, the switch 30 turns on only if $V_{GS}$ of the pMOS 40 is negative. During the battery fault condition, even if a voltage appears on the positive terminal of the choke 14 output (e.g., bulk capacitor voltage such as from the bulk capacitor 20), the gate of pMOS switch 40 will be now be at the same voltage as that of source, i.e., $V_{GS}=0$ and the gate of the reverse polarity switch 30 is isolated. The illustrated embodiments in FIGS. 7-10 show that the switch 40 will be open and battery fault does not appear across the inverter 22.

Figure 9:
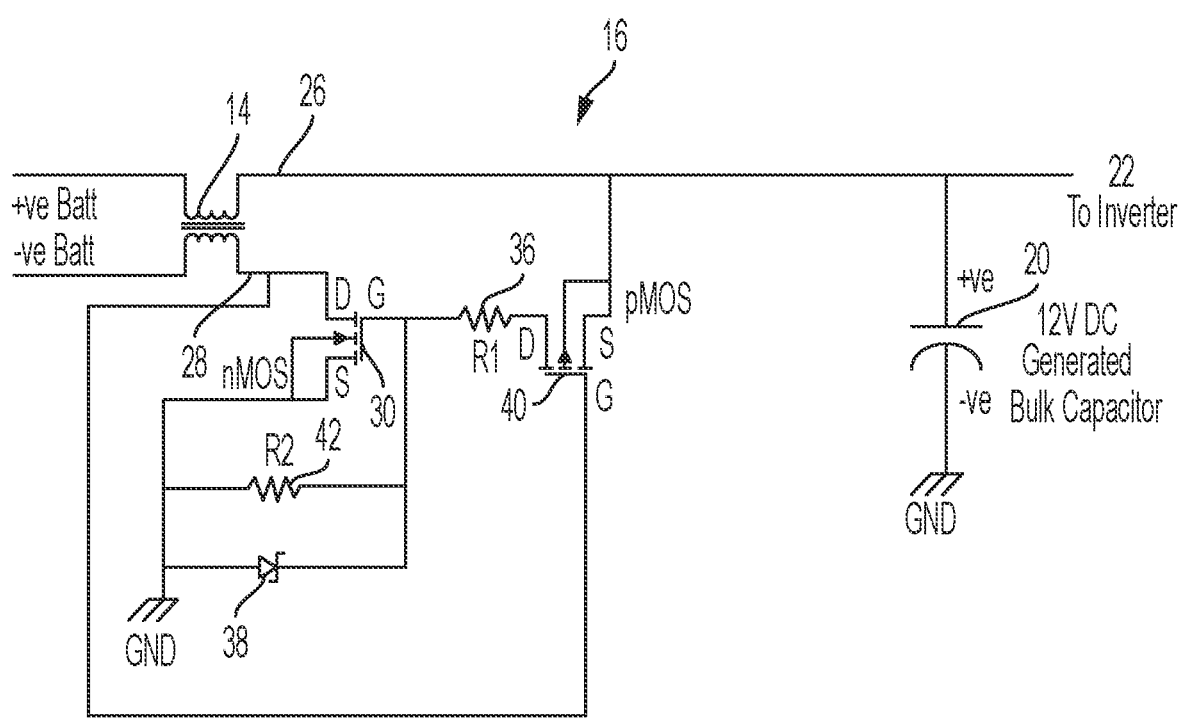
FIG. 9 illustrates a power input circuit with an improved reverse polarity protection circuit comprising a resistor across the gate and source of the reverse polarity FET to quickly discharge its gate-source capacitance, according to one or more embodiments.
Figure 10:
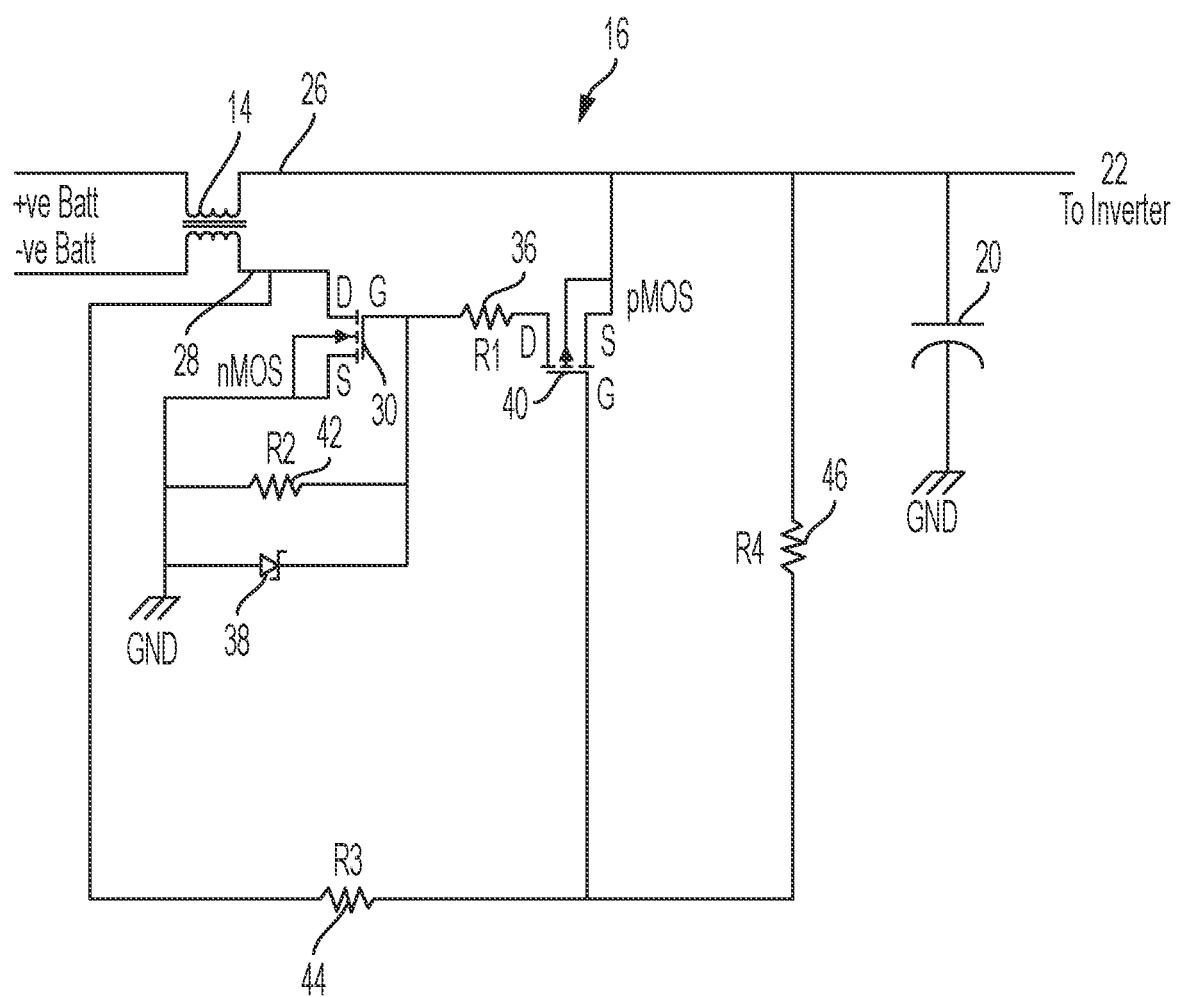
FIG. 10 illustrates a power input circuit with an improved reverse polarity protection circuit comprising a voltage divider to quickly discharge gate-source capacitance of the reverse polarity FET, according to one or more embodiments.
Figure 11:
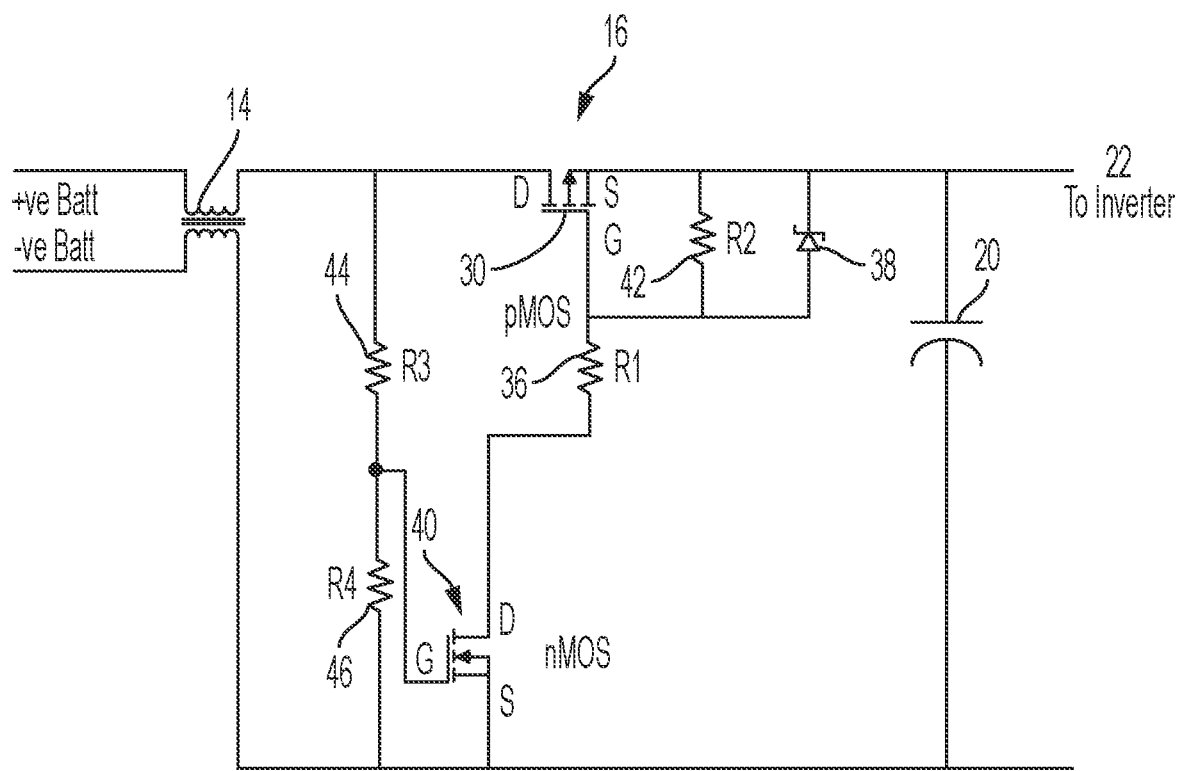
FIG. 11 illustrates a power input circuit with an improved reverse polarity protection circuit comprising a nMOS across the gate resistor of a reverse polarity pMOS and controller independent, according to one or more embodiments.

The topology of the illustrative embodiments in FIGS. 7-11 does not require any control signals from the microcontroller and is therefore advantageous because, during the battery fault condition, there is no supply for the microcontrollers. See FIG. 8, which further illustrates the topology of FIG. 7 while omitting the power switch override for clarity to show that the RPP circuit 16 is independent of any microcontroller signals. FIGS. 9-11 similarly omit the power switch override.

FIG. 9 illustrates another embodiment of a for improved robustness. During testing, the RPP circuit 16 in FIG. 7 operates as expected for normal conditions. To simulate a fault scenario during testing, the RPP circuit 16 in FIG. 7 was manually modified, the DC bus was shorted, and the motor 24 was rotated using a dyno setup. The RPP circuit 16 worked as expected during testing under normal operating conditions, thereby turning OFF the reverse polarity protection switch 30. But when tested for operation during transient occurrence of fault, even though the pMOS 40 turns OFF, because the gate and source are at same voltage due to fault, the reverse polarity switch 30 remains ON because of its gate-source capacitance. In other words, fault may appear until this capacitance is completely discharged. To make the RPP circuit 16 more responsive and act as soon as a fault occurs, a resistor 42 is added in parallel to the gate-source of reverse polarity protection switch 30, as shown in FIG. 9.

A resistor R2 across the gate and source of reverse polarity protection FET switch 30 is added to discharge the voltage held by the gate-source capacitance. Now, with this modification, the voltage appearing across $V_{GS}$ of the reverse polarity switch 30 is nothing but voltage appears across R2 in the voltage divider formed by $R_{ds}$ of pMOS, R1 and R2. See:

$$V_{GS} = V_{DC} * \left(\frac{R_2}{R_{ds} + R_1 + R_2}\right).$$

$R_{ds}$ of pMOS is very low and can be neglected. So, effectively:

$$V_{GS} = V_{DC} * \left(\frac{R_2}{R_1 + R_2}\right).$$

In order to put maximum voltage across the gate-source, $R_2 \gg R_1$. In one embodiment, $R_2=51$ kΩ and $R_1=1$ kΩ. These values may vary based on power loss requirements and gate capacitance of the FET.

In a similar fashion, to make the RPP circuit 16 more robust, resistors can be added parallel to $V_{DC}$ and the gate of pMOS 40 is connected to a voltage divider comprising resistors 44 ($R_3$) and 46 ($R_4$). This has two advantages. Resistor $R_3$ acts as gate resistance for pMOS and resistor $R_4$ is now effectively across gate and source of pMOS and it discharges the gate capacitance, as shown in FIG. 10.

As illustrated in FIG. 10, $$V_{GS} \text{ of } pMOS = V_{DC} * \left(\frac{R_4}{R_3 + R_4}\right)$$

and, in order to put maximum voltage across the gate-source of pMOS, $R_4 \gg R_3$.

In one embodiment, $R_4=51$ kΩ and $R_3=1$ kΩ. These values vary mainly based on power loss requirements and voltage divider ratio. In addition, this resistor branch with R3 and R4 provides a discharge path for the bulk capacitor 20 during any conditions.

The reverse polarity protection circuit 30 has been shown on the low side 28 of a power input circuit in FIGS. 7-10 for example. The reverse polarity protection circuit 30, however, can also be placed on the high or supply side 26 of a power input as shown in FIG. 11. FIG. 11 illustrates another example embodiment of a power input circuit with an improved reverse polarity protection circuit that comprises a nMOS 40 across the gate resistor of a reverse polarity pMOS 30. In the event of a reverse polarity condition, the gate of the nMOS switch 40 will not turn on and therefore isolates the pMOS 30 gate from ground and hence switch 30 is not biased.

When the polarity protection circuit 30 is connected on the low side 26 of a power input circuit, the circuit 30 can be implemented using any of a plurality of different types of switches such as, but not limited to, a MOSFET (e.g., nMOS type), a bipolar junction transistor (e.g., a NPN type), an insulated-gate bipolar transistor (e.g., n-channel type), or a thyristor (e.g., n-channel type). The switch 40, in turn, can be any of a plurality of different types of switches such as, but not limited to, a MOSFET (e.g., pMOS type), a bipolar junction transistor (e.g., a PNP type), an insulated-gate bipolar transistor (e.g., p-channel type), or a thyristor (e.g., p-channel type).

When the polarity protection circuit 30 is connected on the high side 28 of a power input circuit, the circuit 30 can be implemented using any of a plurality of different types of switches such as, but not limited to, a MOSFET (e.g., pMOS type), a bipolar junction transistor (e.g., a PNP type), an insulated-gate bipolar transistor (e.g., p-channel type), or a thyristor (e.g., p-channel type). The switch 40, in turn, can be any of a plurality of different types of switches such as, but not limited to, a MOSFET (e.g., nMOS type), a bipolar junction transistor (e.g., a NPN type), an insulated-gate bipolar transistor (e.g., n-channel type), or a thyristor (e.g., n-channel type).

The illustrative embodiments of RPP circuits 16 in FIGS. 3-11 improve performance of the motor power system 10 as illustrated in FIGS. 12A and 12B. FIGS. 12A and 12B represent torque and supply current experimental data obtained using an improved RPP circuit 16 for input short circuit condition at varying motor speeds. The electromagnetic torque plot in FIG. 12A illustrates that, under a conventional power input circuit configuration (e.g., FIG. 2), there is a large braking torque indicated at 50 present under a battery short circuit condition that is mitigated as indicated at 52 (the residual torque is friction) by employing an improved RPP circuit 16 as described with reference to the illustrative embodiments in FIGS. 3-11 or their equivalents. The supply current curve 56 in FIG. 12B also illustrates that the improved RPP circuit 16 as described with reference to the illustrative embodiments in FIGS. 5-11 or their equivalents isolates the bulk capacitor 20 from the short-circuited battery line thus not allowing any current to flow.

The systemic issue of microcontroller restart after a post-fault shutdown sequence exists in all existing electric motor drive systems. With reference to FIG. 1, unintended microcontroller restart after a post-fault shutdown sequence occurs when the motor 24 starts spinning at high velocities and charges the bulk capacitor 20 which, in-turn, acts as a voltage input to the power supply (e.g., voltage regulator 18), which ultimately powers the microcontroller up. This is an undesirable condition particularly in redundant systems where inter-micro communications exist. This is because the active microcontroller does not expect to start or resume receiving messages from the controller that has been powered off. The latter behaves as if it is undergoing a new startup sequence and thus starts the inter-micro communication process.

Figure 13:
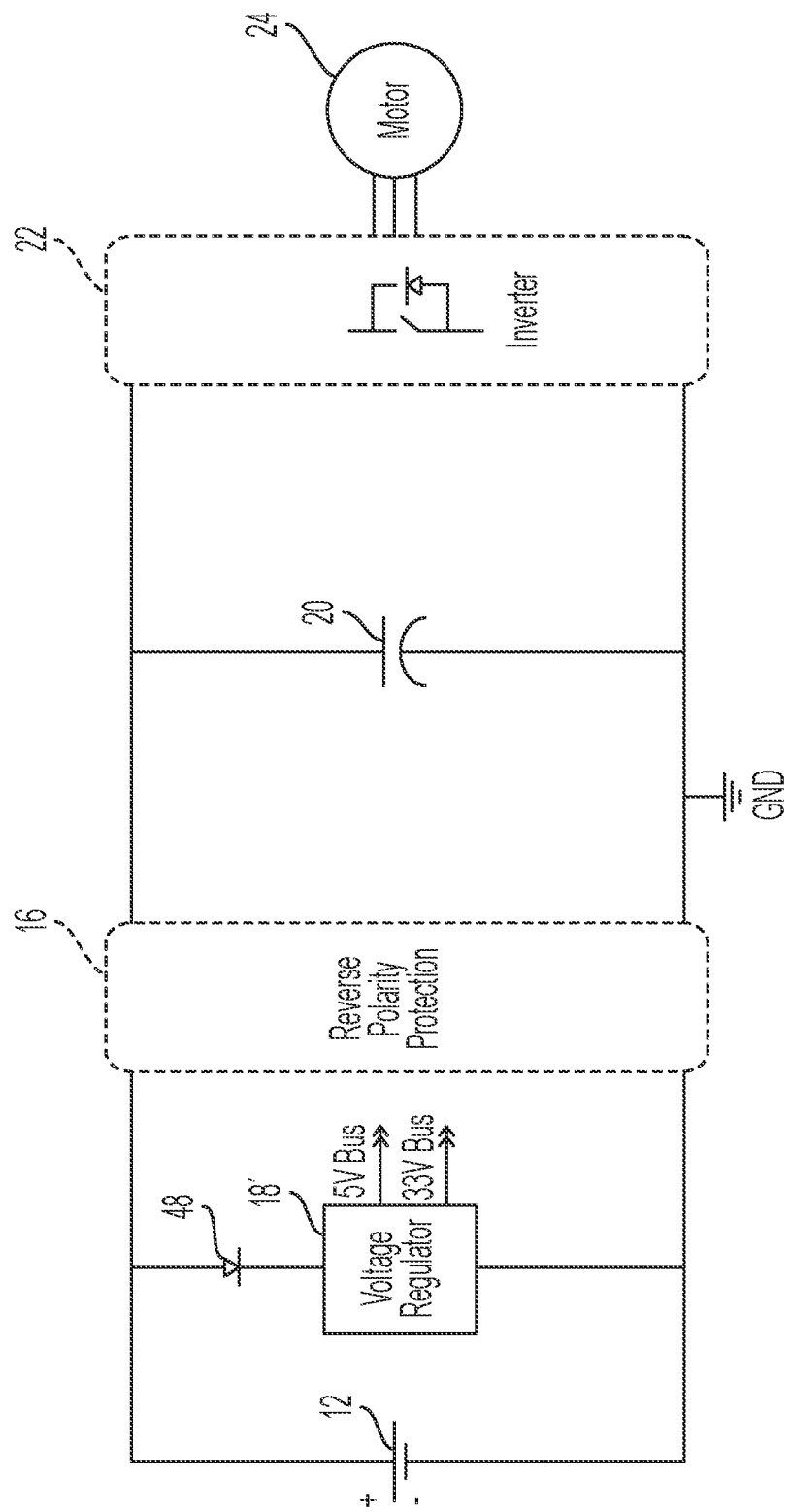
FIG. 13 illustrates a power input circuit of a motor drive system having the voltage regulator circuit connected to the power source input side of a reverse polarity protection circuit according to one or more embodiments.

With reference to FIG. 13 and in accordance with an illustrative embodiment, the ground of the power supply (e.g., voltage regulator 18') is connected to the opposite side of the reverse polarity protection FET 16 than shown in FIG. 1. In other words, the voltage generator 18' in FIG. 12 is connected to the external source input side of the RPP circuit 16 (e.g., the reverse polarity protection FET) instead of to the power ground. Further, a low-power diode 48 is added in series to the regulator 18' since it is sensitive to reverse polarity voltage inputs (e.g. battery connections reversed). It is to be understood that the RPP circuit 16 can be any of the topologies illustrated in connection with FIG. 2 and FIGS. 3-11.

With continued reference to FIG. 12, a DC link voltage from the bulk capacitor 20 causes the reverse polarity FET 30 to open, thus disconnecting and isolating the voltage regulator 18'. Since the voltage regulator 18' does not receive a voltage input, the microcontroller(s) normally powered via the voltage regulator 18' is not able to power up. This solution introduces a potential difference between the power ground and the new voltage regulator 18' ground (i.e., which is now the same as the voltage input source or battery 12 during normal operating conditions); however, this potential difference is negligible and does not impact the voltage regulator 18'.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

The invention claimed is:

1. A power input circuit connected between a power source and a motor in an electric motor drive system, the power input circuit comprising:
   a reverse polarity protection circuit connected across the positive terminal and the negative terminal of the power source and comprising a first switch disposed between the power source and a load comprising the motor, the first switch configured to provide reverse polarity protection from the power source; and
   a voltage regulator circuit connected in parallel with the reverse polarity protection circuit and across the positive terminal and the negative terminal of the power source;
   wherein the voltage regulator circuit is connected to the power source and an input side of the reverse polarity protection circuit to isolate the voltage regulator circuit from a load side voltage; and
   wherein the voltage regulator comprises a 5V bus output to a microcontroller in the electric motor drive system, and the voltage regulator circuit is connected to the power source and an input side of the reverse polarity protection circuit to isolate the voltage regulator circuit from the load side voltage and prevent unwanted restart of the microcontroller by the voltage regulator circuit when a load side voltage occurs after a post-fault shutdown of the electric motor drive system.

2. The power input circuit of claim 1, further comprising a diode connected in series with the voltage regulator, the voltage regulator circuit and the diode connected across the terminals of the power source and the diode configured to provide the voltage regulator circuit with reverse polarity protection from the power source.

3. The power input circuit of claim 1, wherein the reverse polarity protection circuit comprises a second switch connected to the first switch and configured to prevent activation of the first switch to close and conduct power from the power source to the load during a reverse polarity condition of the power source, and to isolate the load during a short circuit condition of the power source.

4. The power input circuit of claim 1, wherein the reverse polarity protection circuit is connected in parallel with the load, and the voltage regulator circuit is connected in parallel with the load.

5. The power input circuit of claim 3, wherein the second switch has a voltage needed for activation to open from being closed, the second switch being configured to open and prevent activation of the first switch to close and conduct power from the power source to the load when the first switch is open during a reverse polarity condition of the power source, and to isolate the first switch from activation to close due to a load side generated voltage during a short circuit condition of the power source, when the load side generated voltage reaches the voltage needed for activation of the second switch to open.

6. The power input circuit of claim 1, wherein the electric motor drive system is an electric power steering (EPS) system.

* * * * *